(12) United States Patent
Prakash et al.

(10) Patent No.: US 10,182,404 B2
(45) Date of Patent: Jan. 15, 2019

(54) TRANSMIT POWER CALIBRATION FOR MATCHING THE COVERAGE OF DIFFERENT RADIO TECHNOLOGIES ON A COMMON RADIO NODE

(71) Applicant: QUALCOMM Incorporated, San Diego, CA (US)

(72) Inventors: Rajat Prakash, San Diego, CA (US); Mehmet Yavuz, San Diego, CA (US); Farhad Meshkati, San Diego, CA (US); Chirag Sureshbhai Patel, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 14/179,613

(22) Filed: Feb. 13, 2014

(65) Prior Publication Data

US 2014/0256340 A1 Sep. 11, 2014

Related U.S. Application Data

(60) Provisional application No. 61/773,768, filed on Mar. 6, 2013.

(51) Int. Cl.
*H04W 52/16* (2009.01)
*H04W 52/14* (2009.01)
(Continued)

(52) U.S. Cl.
CPC ......... *H04W 52/244* (2013.01); *H04W 52/16* (2013.01); *H04W 84/045* (2013.01); *H04W 52/143* (2013.01); *H04W 52/343* (2013.01)

(58) Field of Classification Search
CPC ... H04W 84/045; H04W 24/02; H04W 36/22; H04W 24/10; H04W 16/32; H04W 84/047; H04W 28/08; H04W 16/08; H04W 16/14; H04W 24/04; H04W 24/08; H04W 36/0072; H04W 36/0083; H04W 36/30;
(Continued)

(56) References Cited

U.S. PATENT DOCUMENTS 8,565,808 B2 * 10/2013 Hosono et al. ............... 455/522
8,792,886 B2 7/2014 Meshkati et al.
(Continued)

FOREIGN PATENT DOCUMENTS

CN 102573036 A 7/2012
EP 2464177 A1 6/2012
(Continued)

OTHER PUBLICATIONS

International Search Report and Written Opinion—PCT/US2014/016543—ISA/EPO—Apr. 16, 2014.
(Continued)

*Primary Examiner* — Natasha W Cosme
(74) *Attorney, Agent, or Firm* — Muncy, Geissler, Olds & Lowe, P.C.

(57) ABSTRACT

A method for wireless communication may comprise, for example, automatically determining first power settings for a first radio access technology (RAT) based on second power settings for a second RAT, and automatically applying the first power settings as power settings for the first RAT.

28 Claims, 7 Drawing Sheets

(51) Int. Cl.
*H04W 52/34* (2009.01)
*H04W 84/04* (2009.01)
*H04W 52/24* (2009.01)

(58) Field of Classification Search
CPC ............. H04W 64/00; H04W 72/0413; H04W 72/0453
USPC ...................................... 455/1, 422.1, 452.1
See application file for complete search history.

(56) References Cited

U.S. PATENT DOCUMENTS

| | | | |
|---|---|---|---|
| 2007/0072638 A1* | 3/2007 | Yang ..................... | H04W 52/50 455/522 |
| 2009/0088083 A1* | 4/2009 | Fujii ................... | H04W 52/242 455/69 |
| 2011/0243257 A1* | 10/2011 | Lucidarme et al. ......... | 375/259 |
| 2011/0263281 A1 | 10/2011 | Cai et al. | |
| 2012/0052793 A1 | 3/2012 | Brisebois et al. | |
| 2012/0082192 A1 | 4/2012 | Pelletier et al. | |
| 2012/0149412 A1 | 6/2012 | Nergis et al. | |
| 2013/0052960 A1 | 2/2013 | Do | |
| 2013/0065525 A1* | 3/2013 | Kiukkonen ........... | H04W 52/36 455/41.2 |
| 2013/0165107 A1 | 6/2013 | Richardson | |
| 2013/0295926 A1* | 11/2013 | Michel et al. ................ | 455/434 |
| 2014/0220980 A1* | 8/2014 | Teyeb et al. .................. | 455/437 |

FOREIGN PATENT DOCUMENTS

| | | |
|---|---|---|
| WO | 2010124243 A1 | 10/2010 |
| WO | 2012122116 A1 | 9/2012 |

OTHER PUBLICATIONS

Taiwan Search Report—TW103107036—TIPO—dated Jun. 16, 2015.

Huang Z., et al., "Interference Mitigation in Two-Tier OFDMA Femtocell Networks with Differential Evolution", Global Telecommunications Conference (Globecom 2011), 2011 IEEE Conference Date(s): Dec. 5-9, 2011, pp. 1-6.

Lopez-Perez D., et al., "Dynamic Downlink Frequency and Power Allocation in OFDMA Cellular Networks", IEEE Transactions on Communications, Oct. 2012, vol. 60, No. 10, pp. 2904-2914.

Taiwan Search Report—TW103107036—TIPO—May 27, 2016.

\* cited by examiner

TRANSMIT POWER CALIBRATION FOR MATCHING THE COVERAGE OF DIFFERENT RADIO TECHNOLOGIES ON A COMMON RADIO NODE

CROSS-REFERENCE TO RELATED APPLICATIONS

The present application for patent claims the benefit of U.S. Provisional Application No. 61/773,768, entitled "TRANSMIT POWER CALIBRATION FOR MATCHING THE COVERAGE OF DIFFERENT RADIO TECHNOLOGIES ON A COMMON RADIO NODE," filed Mar. 6, 2013, assigned to the assignee hereof, and expressly incorporated herein by reference in its entirety.

BACKGROUND

Aspects of this disclosure relate generally to telecommunications, and more particularly to multi-radio access technology (RAT) deployment environments and the like.

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that may support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

Small-coverage base stations (or simply, small cells) are typically low-powered wireless access points that may operate in licensed spectrum and be controlled by the network operator, may be connected with existing handsets, and use a residential digital subscriber line (DSL) or cable connection for backhaul. In various standards or contexts, a small cell base station may be referred to as a home node B (HNB), home e-node B (HeNB), access point base station, etc. With the increasing popularity of small cells, there is a desire to address power settings related to deployment of small cell base stations.

SUMMARY

Systems and method for deploying small-coverage base stations in multi-radio access technology (RAT) environments are disclosed.

A method for wireless communication is disclosed. The method may comprise, for example, automatically determining first power settings for a first radio access technology (RAT) based on second power settings for a second RAT, and automatically applying the first power settings as power settings for the first RAT.

An apparatus for wireless communication is also disclosed. The apparatus may comprise, for example, at least one processor and memory coupled to the at least one processor for storing data. The at least one processor may be configured to, for example, automatically determine first power settings for a first RAT based on second power settings for a second RAT, and automatically apply the first power settings as power settings for the first RAT.

Another apparatus for wireless communication is also disclosed. The apparatus may comprise, for example, means for automatically determining first power settings for a first RAT based on second power settings for a second RAT, and means for automatically applying the first power settings as power settings for the first RAT.

A computer-readable medium comprising code, which, when executed by at least one computer, causes the at least one computer to perform operations for wireless communication is also disclosed. The computer-readable medium may comprise, for example, code for automatically determining first power settings for a first RAT based on second power settings for a second RAT, and code for automatically applying the first power settings as power settings for the first RAT.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
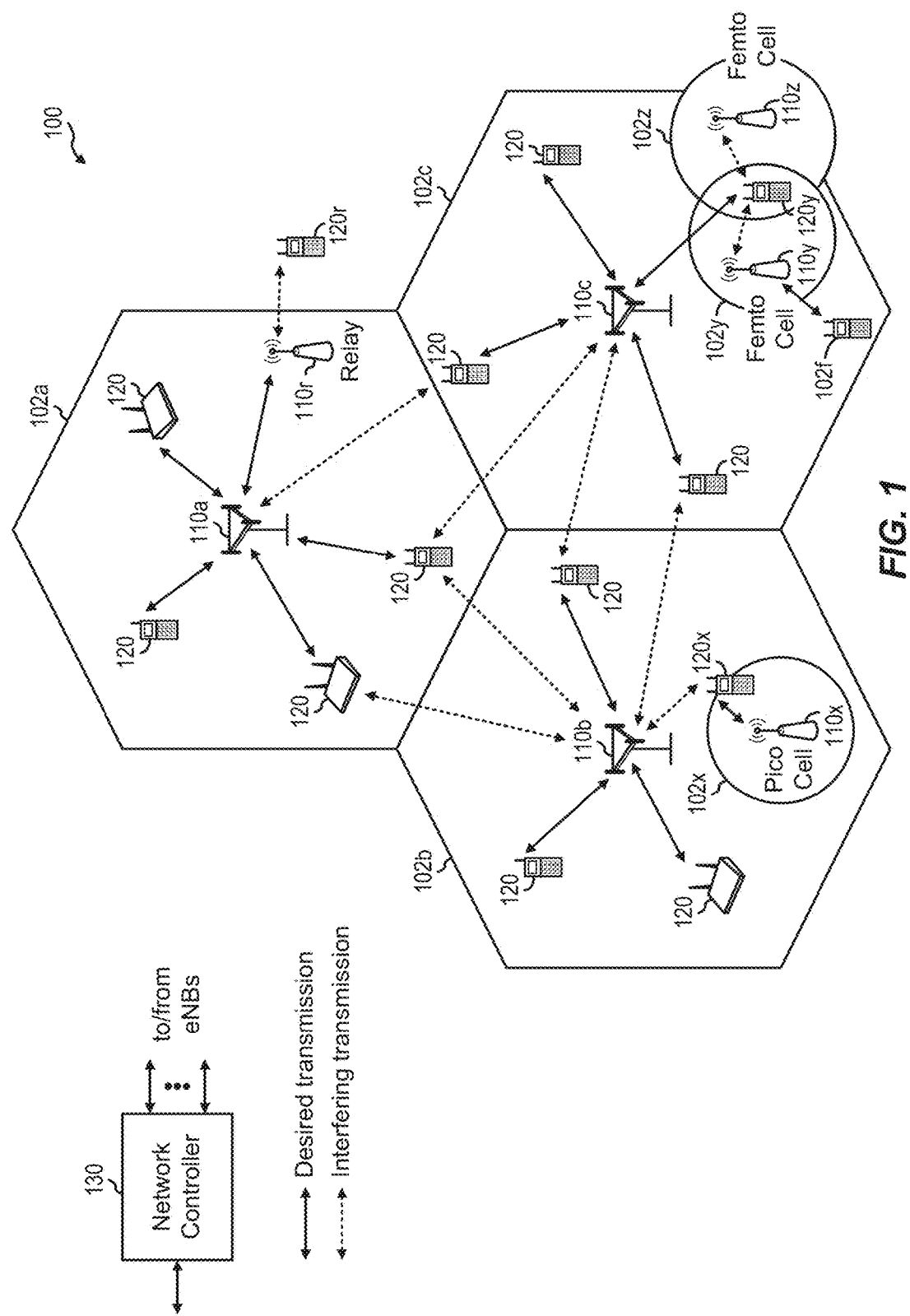
FIG. 1 is a block diagram conceptually illustrating an example of a telecommunications system.

Referring now to FIG. 1, a wireless communication system 100, which may be an LTE network, is illustrated in accordance with various embodiments presented herein. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell and various small cells, such as a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, as a first example of a small cell. The eNBs 110y and 110z may be femto eNBs for the femto cells 102y and 102z, respectively, as a second example of a small cell. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs and small cell eNBs, such as pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas small cell eNBs such as pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs and small cell eNBs such as pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For example, UE 120y may be in proximity to femto eNBs 110y, 110z. Uplink transmissions from UE 120y may interfere with femto eNBs 110y, 110z; uplink transmissions from UE 120y may jam femto eNBs 110y, 110z and degrade the quality of reception of other uplink signals to femto eNBs 110y, 110z. Femto eNB 110y may be an open-access femto eNB with no restricted associations to UEs. In one example femto eNB 110z may be a higher transmission power eNB initially deployed to provide coverage to an area. Femto eNB 110z may be deployed to cover a large service area. Femto eNB 110y may be a lower transmission power eNB deployed later than Femto eNB 110z to provide coverage for a hotspot area for loading traffic from either or both eNB 110c, eNB 110z. The uplink transmissions from UE 120y may interfere with transmissions from UE 120f and reduce the quality of service QoS experienced by UE 120f. Femto eNB 110y may seek to adapt its transmission power to mitigate interference in accordance with the methodology below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
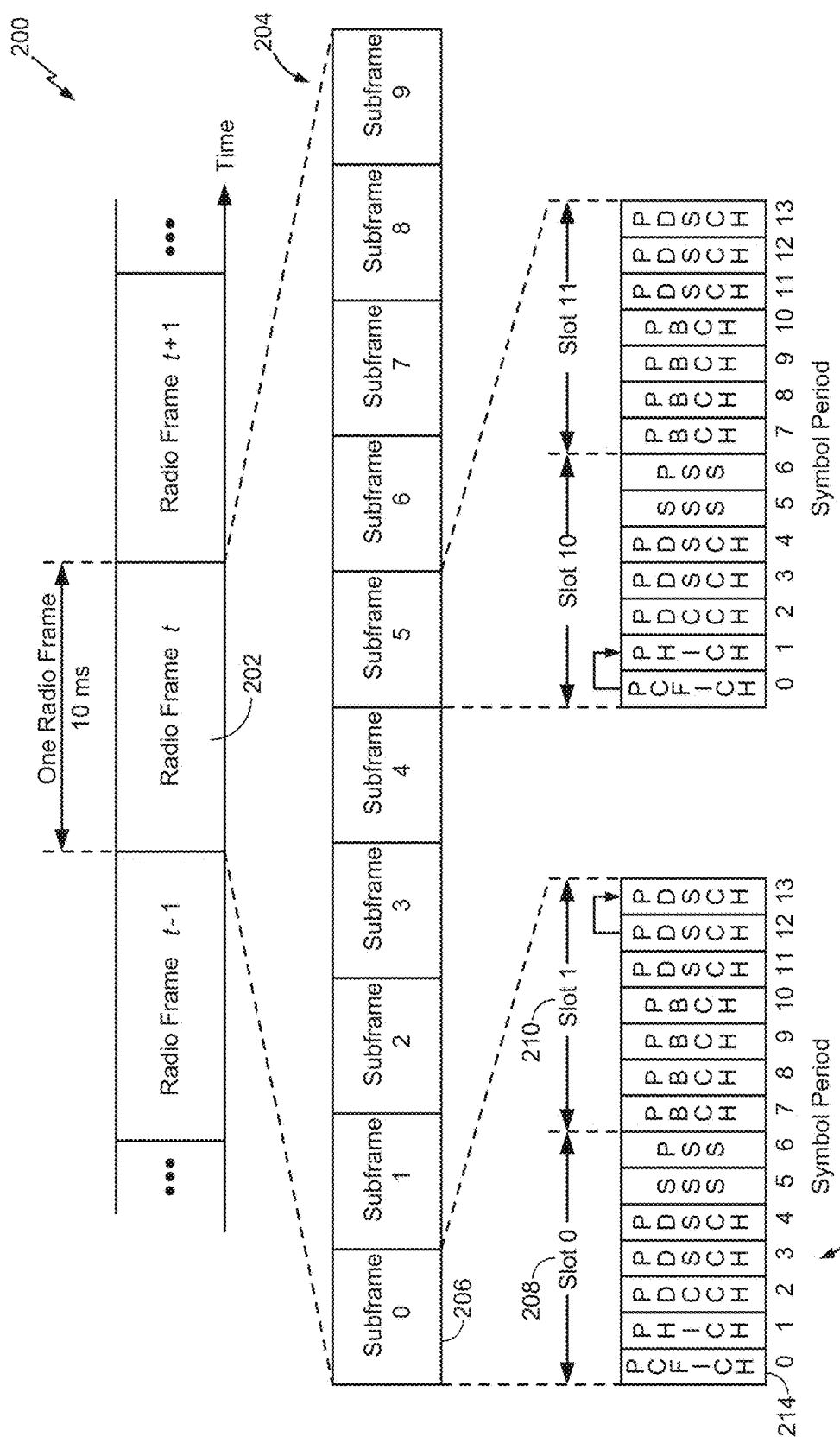
FIG. 2 is a block diagram conceptually illustrating an example of a down link frame structure in a telecommunications system.
Figure 6:
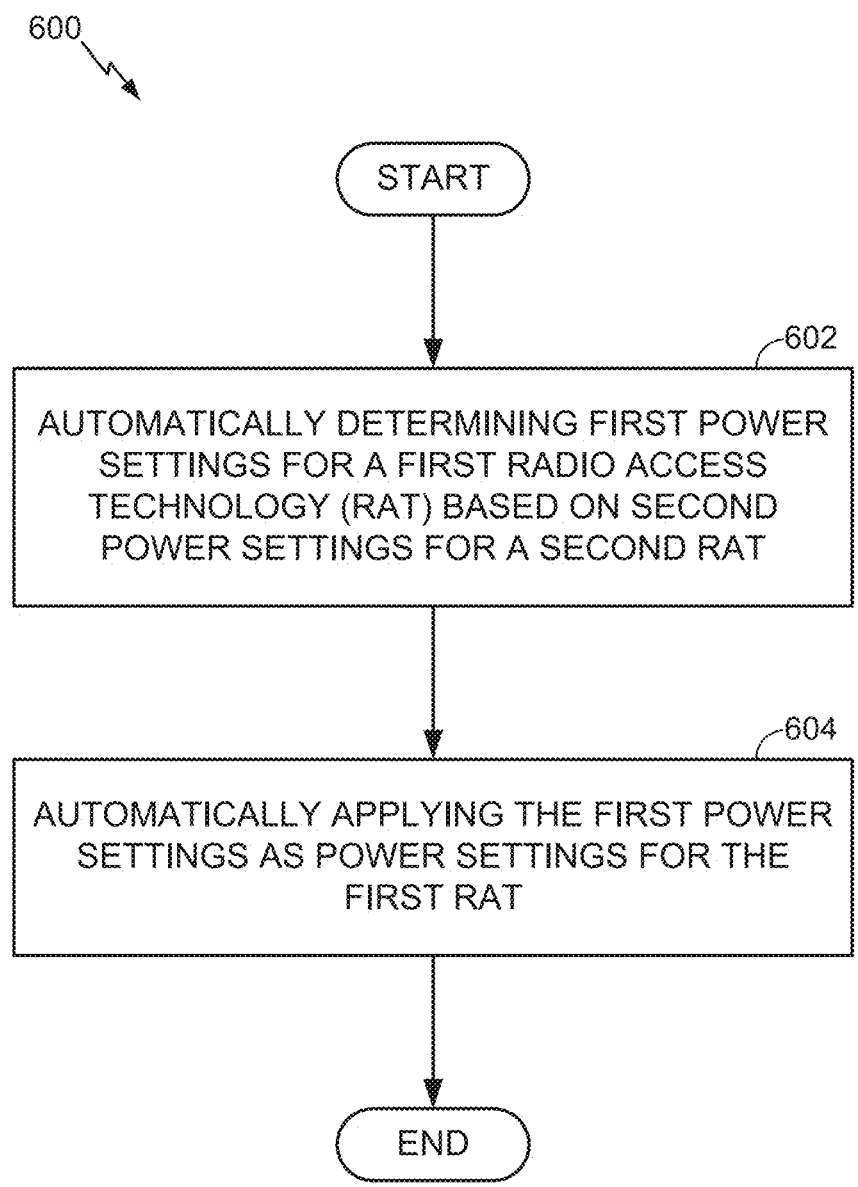
FIG. 6 illustrates aspects of a methodology for transmission power calibration by a radio node, e.g., a small cell.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
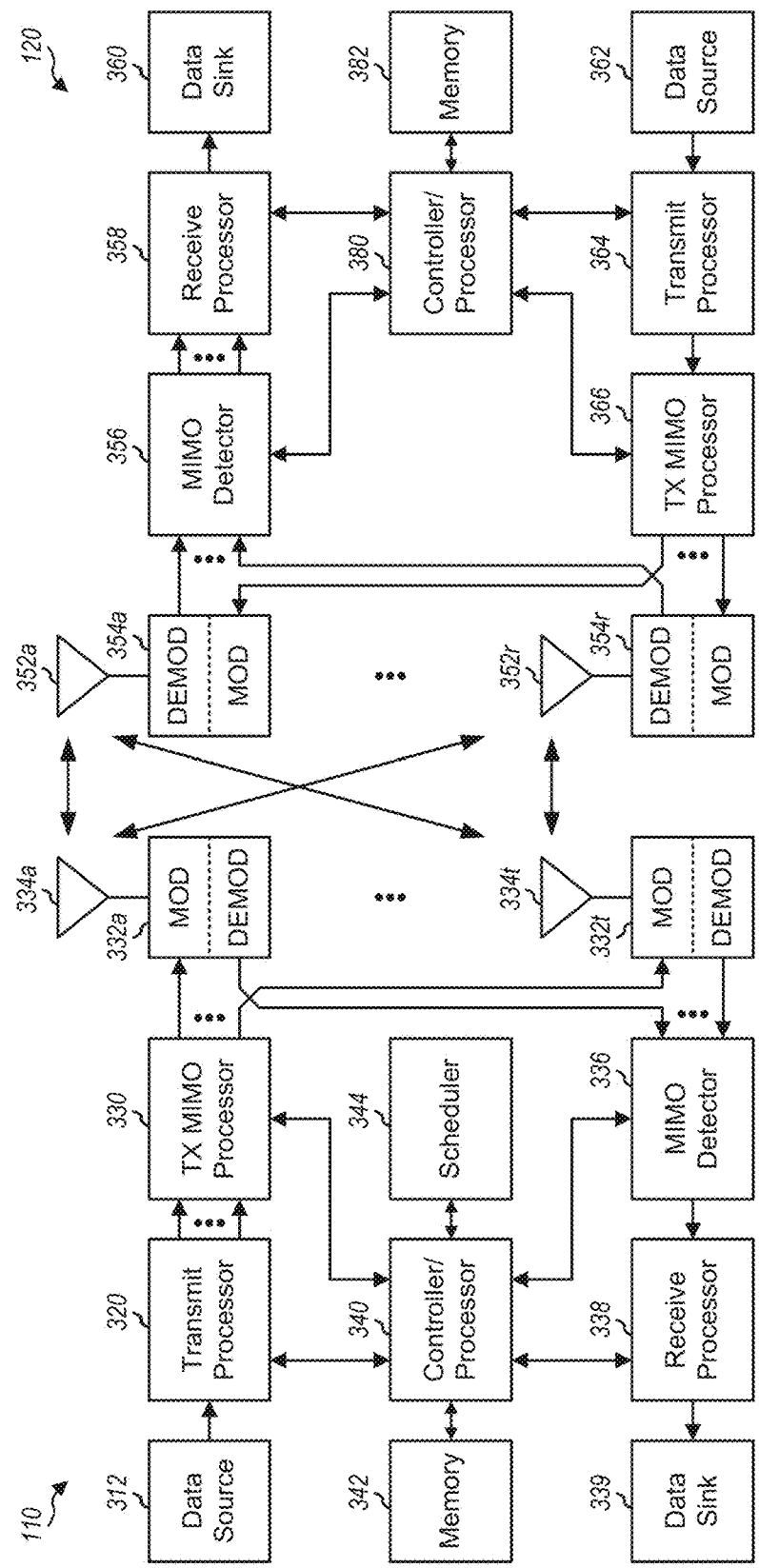
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a small cell. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
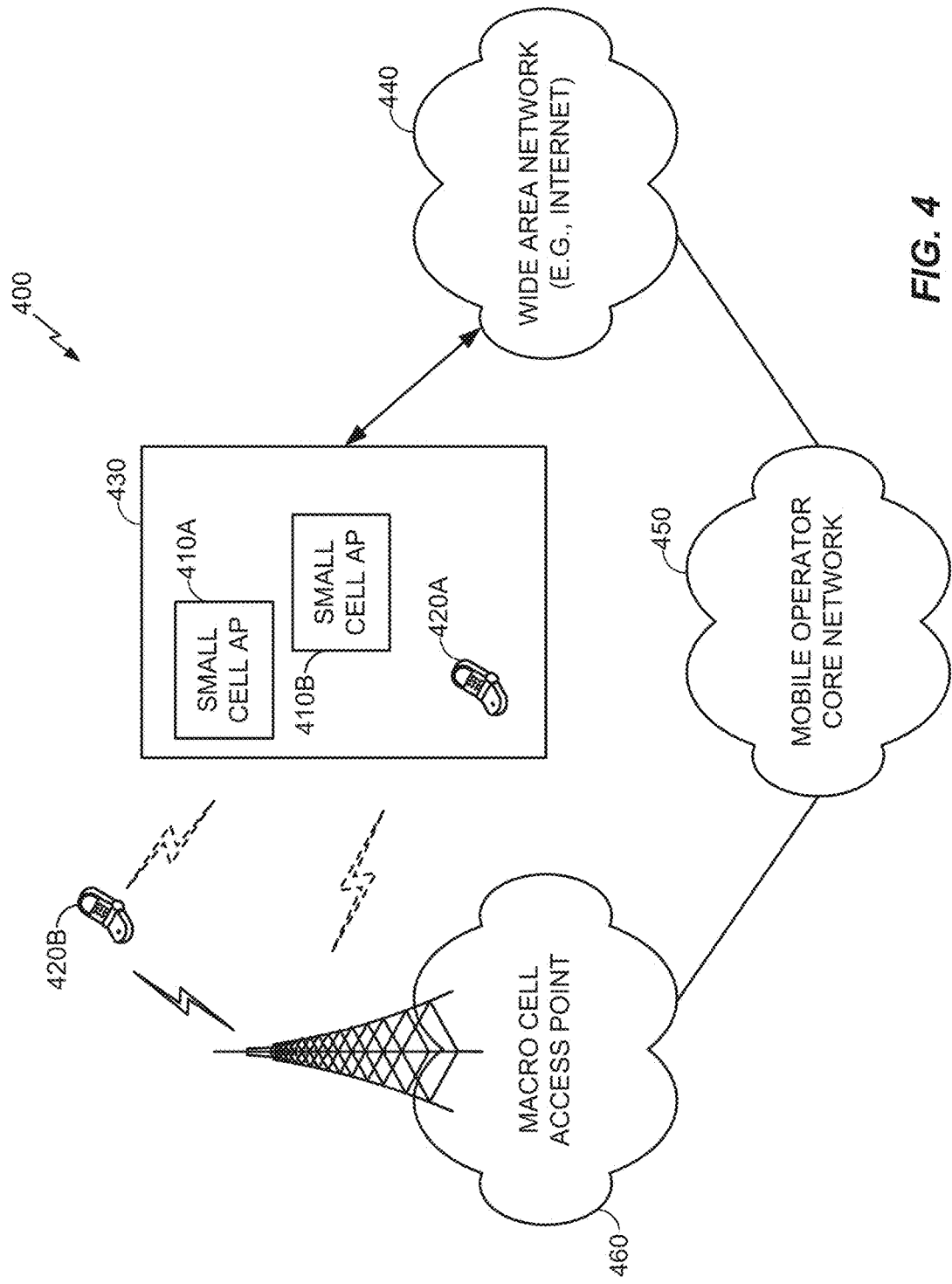
FIG. 4 is a block diagram illustrating another example communication system.

FIG. 4 illustrates an exemplary communication system 400 where one or more small cell APs are deployed within a network environment. Specifically, the system 400 includes multiple small cell APs 410A and 410B (e.g., small cell eNBs or H(e)NB) installed in a relatively small scale network environment (e.g., in one or more user residences 430). Each small cell AP 410 may be coupled to a wide area network 440 (e.g., the Internet) and a mobile operator core network 450 via a digital subscriber line (DSL) router, a cable modem, a wireless link, or other connectivity means (not shown). As will be discussed below, each small cell AP 410 may be configured to serve associated access terminals 420 (e.g., access terminal 420A) and, optionally, alien access terminals 420 (e.g., access terminal 420B). In other words, access to small cell APs 410 may be restricted such that a given access terminal 420 may be served by a set of designated (e.g., home) small cell AP(s) 410 but may not be served by any non-designated small cell APs 410 (e.g., a neighbor's small cell AP).

Referring again to FIG. 4, the owner of a small cell AP 410 may subscribe to mobile service, such as, for example, 3G mobile service, offered through the mobile operator core network 450. In another example, the small cell AP 410 may be operated by the mobile operator core network 450 to expand coverage of the wireless network. In addition, an access terminal 420 may be capable of operating both in macro environments and in smaller scale (e.g., residential) network environments. Thus, for example, depending on the current location of the access terminal 420, the access terminal 420 may be served by a macro access point 460 or by any one of a set of small cell APs 410 (e.g., the small cell APs 410A and 410B that reside within a corresponding user residence 430). For example, when a subscriber is outside his home, he is served by a standard macro access point (e.g., node 460) and when the subscriber is at home, he is served by a small cell AP (e.g., node 410A). Here, it should be appreciated that a small cell AP 410 may be backward compatible with existing access terminals 420.

A small cell AP 410 may be deployed on a single frequency or, in the alternative, on multiple frequencies. Depending on the particular configuration, the single frequency or one or more of the multiple frequencies may overlap with one or more frequencies used by a macro access point (e.g., node 460). In some aspects, an access terminal 420 may be configured to connect to a preferred small cell AP (e.g., the home small cell AP of the access terminal 420) whenever such connectivity is possible. For example, whenever the access terminal 420 is within the user's residence 430, it may communicate with the home small cell AP 410.

In some aspects, if the access terminal 420 operates within the mobile operator core network 450 but is not residing on its most preferred network (e.g., as defined in a preferred roaming list), the access terminal 420 may continue to search for the most preferred network (e.g., small cell AP 410) using a Better System Reselection (BSR), which may involve a periodic scanning of available systems to determine whether better systems are currently available, and subsequent efforts to associate with such preferred systems. Using an acquisition table entry (e.g., in a preferred roaming list), in one example, the access terminal 420 may limit the search for specific band and channel. For example, the search for the most preferred system may be repeated periodically. Upon discovery of a preferred small cell AP, such as small cell AP 410, the access terminal 420 selects the small cell AP 410 for camping within its coverage area.

A small cell AP may be restricted in some aspects. For example, a given small cell AP may only provide certain services to certain access terminals. In deployments with so-called restricted (or closed) association, a given access terminal may only be served by the macro cell mobile network and a defined set of small cell APs (e.g., the small cell APs 410 that reside within the corresponding user residence 430). In some implementations, a small cell AP may be restricted to not provide, for at least one access terminal, at least one of: signaling, data access, registration, paging, or service.

In some aspects, a restricted small cell AP (which may also be referred to as a Closed Subscriber Group H(e)NB) is one that provides service to a restricted provisioned set of access terminals. This set may be temporarily or permanently extended as necessary. In some aspects, a Closed Subscriber Group (CSG) may be defined as the set of access nodes (e.g., small cell APs) that share a common access control list of access terminals. A channel on which all small cell APs (or all restricted small cell APs) in a region operate may be referred to as a small cell channel.

Various relationships may thus exist between a given small cell AP and a given access terminal. For example, from the perspective of an access terminal, an open small cell AP may refer to a small cell AP with no restricted association. A restricted small cell AP may refer to a small cell AP that is restricted in some manner (e.g., restricted for association and/or registration). A home small cell AP may refer to a small cell AP on which the access terminal is authorized to access and operate on. A guest small cell AP may refer to a small cell AP on which an access terminal is temporarily authorized to access or operate on. An alien small cell AP may refer to a small cell AP on which the access terminal is not authorized to access or operate on, except for perhaps emergency situations (e.g., 911 calls).

From a restricted small cell AP perspective, a home access terminal may refer to an access terminal that authorized to access the restricted small cell AP. A guest access terminal may refer to an access terminal with temporary access to the restricted small cell AP. An alien access terminal may refer to an access terminal that does not have permission to access the restricted small cell AP, except for perhaps emergency situations, for example, 911 calls (e.g., an access terminal that does not have the credentials or permission to register with the restricted small cell AP).

For convenience, the disclosure herein describes various functionality in the context of a small cell AP. It should be appreciated, however, that a pico node may provide the same or similar functionality as a small cell AP, but for a larger coverage area. For example, a pico node may be restricted; a home pico node may be defined for a given access terminal, and so on.

In accordance with one or more embodiments of the present disclosure, there are provided techniques for transmit power calibration for matching the coverage of different technologies (e.g., radio access technologies (RATs)) on a common radio node.

For small cells, supporting multiple RATs, it may be desirable to match the coverage offered by the RATs. For example, the coverage for LTE and CDMA2000 may be matched to enable circuit switched fallback from LTE to CDMA2000. Matching the coverage may be performed by field testing and drive testing, but this is expensive. Coverage matching may also be challenging if the power of one RAT changes due to interference or other reasons, leading to a need to reset the coverage of other RATs. The present disclosure accordingly provides an automatic method to achieve coverage matching.

Figure 5:
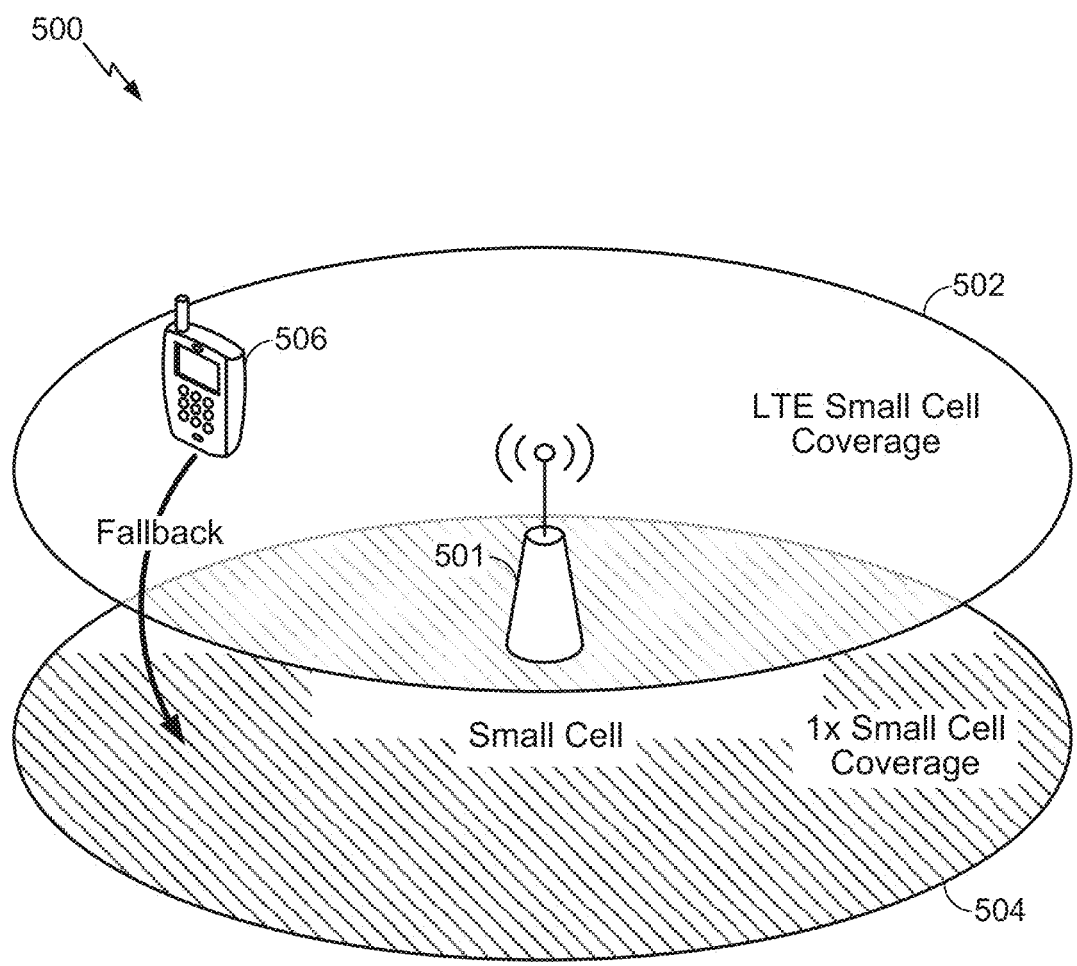
FIG. 5 is a block diagram illustrating an example small cell having multiple radio access technology (RAT) coverage.

FIG. 5 is a block diagram illustrating an example system 500 including a small cell having multiple RAT coverage. The small cell 501 may include LTE and CDMA2000 RATs. For example, the small cell may provide LTE small cell coverage 502 and CDMA2000 1× coverage 504. The two coverage areas may or may not be similar. Matched coverage areas may provide advantages such as supporting circuit switched fallback. For example, a mobile terminal 506 may desire circuit switched fallback from LTE in the LTE coverage 502 to CDMA2000 1× in the CDMA 1x coverage 504. Matched coverage for LTE and CDMA2000 may enable the circuit switched fallback.

In one embodiment, when performing a coverage match of two RATs A and B on two different frequency bands, the power of RAT A on the first band may be set as an offset of the power of RAT B on the second band. For example, P_A=P_B+offset, where P_A is the power of RAT A, P_B is the power of RAT B, and offset is the offset power. Thus, P_A may be a function of P_B and the offset. P_A may change as the power of RAT B changes, i.e., as P_B changes. The offset power may be determined via field testing and/or lab testing, and may depend on the bands of operation of RATs A and B, and depend on the respective propagation profiles of the frequency bands. More advance methods may involve the offset being a function of various quantities.

In another embodiment, for example, for indoor coverage, the power may be small and the propagation barriers may be small. The offset power in this case may be smaller. For outdoor coverage, the propagation barriers may be more significant, leading to a need for a larger offset power. For example, P_A=P_B+f(P_B), where P_A is the power of the RAT A, P_B is the power of RAT B, and f(P_B) is a power value that is a function of the power of RAT B. f(P_B) may be any suitable function.

In another embodiment, the coverage match may depend on the receiver sensitivity at the edge of a coverage area. If frequency bands corresponding to RATs A and B are different, the receiver sensitivity may be different. If the difference between the two receiver sensitivities is Delta dB, a same coverage may be met with the transmit power P_A being the Delta dB higher than P_B (e.g., Delta=Rx_Sensor_A−Rx_Sensor_B, where Rx_Sensor_A is the receiver sensitivity at RAT A, and Rx_Sensor_B is the receiver sensitivity at RAT B). For example, P_A=P_B+offset+Delta, where P_A is the power of the RAT A, P_B is the power of RAT B, 'offset' is the offset power, and Delta may be the Delta difference in receiver sensitivity between RATs A and B as described above. Delta and/or the offset may be a function of P_A and/or P_B (e.g., Delta=f1(P_A, P_B), offset=f2(P_A, P_B)), with the functions being any suitable function.

In another embodiment, another factor influencing the edge of coverage may be the interference level. If the frequency bands corresponding to RATs A and B experience different interference from other cells, the coverage of the two RATs A and B may be different. For example, if the frequency band of RAT B experiences interference from a nearby macrocell, the coverage of RAT B may be reduced due to the macrocell signal. Let I_A and I_B be the interference experienced on the frequency bands of RATs A and B, respectively. To reach the same coverage on the two frequency bands, P_A=P_B+offset+(I_A−I_B), where P_A is the power of the RAT A, P_B is the power of RAT B, offset is the offset power. The power setting P_A may depend on a function of the interference difference (e.g., P_A=f(I_A, I_B)+ . . . ), with the function being any suitable function. The offset may be a function of P_A and/or P_B (e.g., offset=f(P_A, P_B)), with the function being any suitable function.

The interference level may be determined at the small cell or with the aid of mobile terminals. For example a network listen module (NLM) at the small cell may be configured to receive and measure interference. An interference value such as an average or other statistical value may be determined based on measurements at the NLM. In another example, the small cell may receive indications of the interference from mobile terminals, e.g., via measurement reports. The interference level may be based on any combination of the NLM and mobile terminal measurements.

The terms from the different embodiments may be combined in any suitable fashion. For example, the power setting for RAT A, P_A, may be a function of any combination of the settings values including the offset, power settings of RAT B, Delta, and/or interference levels. The small cell may be pre-configured with any or all of the setting values. The settings values including the offset and the functional offset f may be configured at the small cell via operations, administration, and maintenance (OAM). For example, the small cell may select the power settings based on pre-configured settings. For example, the small cell may select the power settings based on instructions from the OAM.

In accordance with one or more aspects of the embodiments described herein, with reference to FIG. 6, there is shown a methodology 600, operable by radio node, such as, for example, a small cell, or the like. Specifically, method 600 describes a way to calibrate transmission power at the radio node. The method 600 may involve, at 602, automatically determining first power settings for a first radio access technology (RAT) based on second power settings for a second RAT. The method 600 may involve, at 604, automatically applying the first power settings as power settings for the first RAT (and, in some instances, the second RAT).

Figure 7:
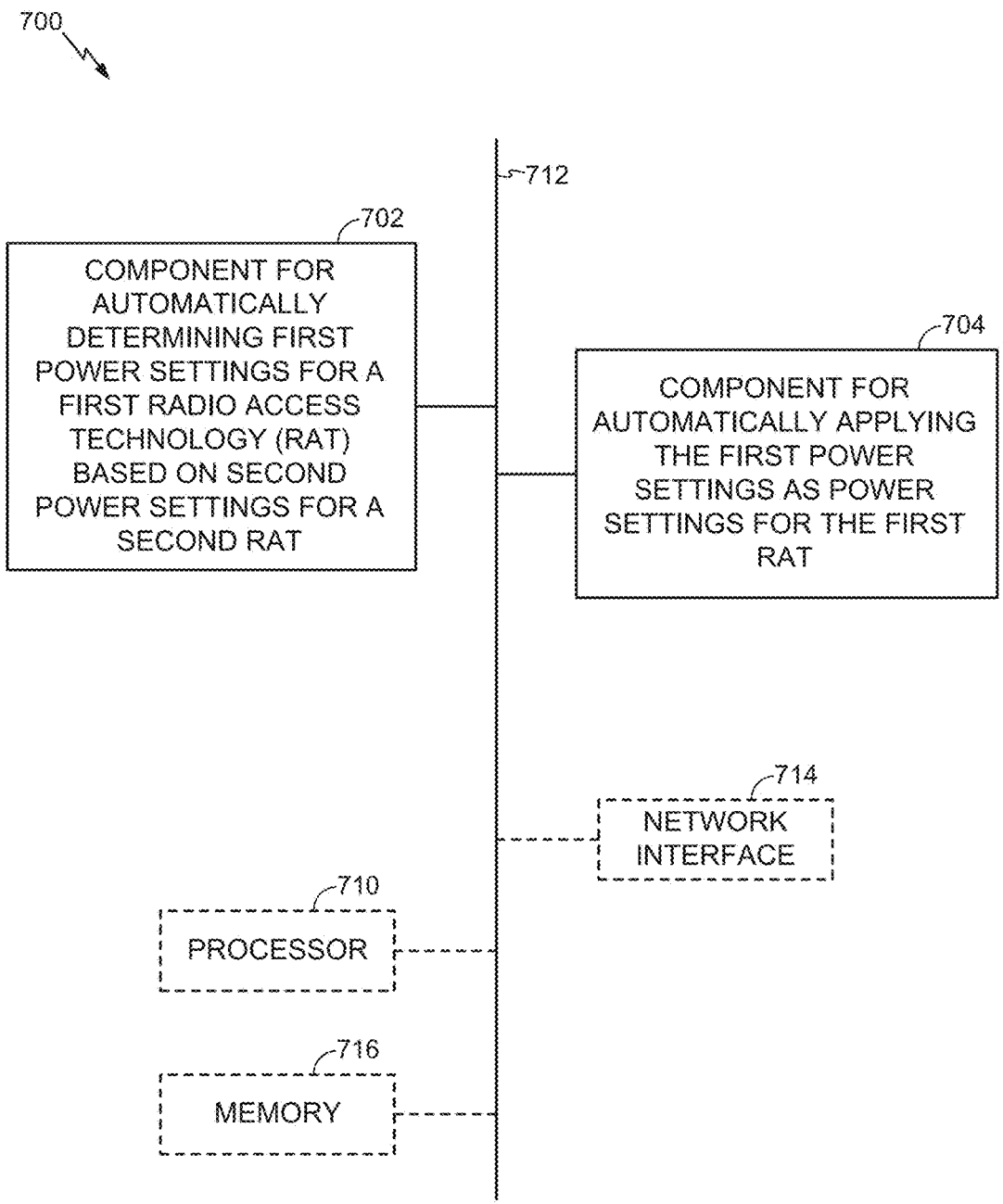
FIG. 7 shows an embodiment of an apparatus for transmission power calibration, in accordance with the methodology of FIG. 6.

With reference to FIG. 7, there is provided an exemplary apparatus 700 that may be configured as a radio node, e.g., a small cell, or as a processor or similar device for use within the radio node, for calibrating transmission power. The apparatus 700 may include functional blocks that can represent functions implemented by a processor, software, or combination thereof (e.g., firmware).

As illustrated, in one embodiment, the apparatus 700 may include an electrical component or module 702 for automatically determining first power settings for a first radio access technology (RAT) based on second power settings for a second RAT. For example, the electrical component 702 may include at least one processor coupled to a memory with instructions for automatically determining first power settings for a first radio access technology (RAT) based on second power settings for a second RAT. The electrical component 702 may be, or may include, means for automatically determining first power settings for a first radio access technology (RAT) based on second power settings for a second RAT. Said means may include an algorithm executed by one or more processors.

The apparatus 700 may include an electrical component 704 for automatically applying the first power settings as power settings for the first RAT. For example, the electrical component 704 may include at least one processor coupled to a memory holding instructions for automatically applying the first power settings as power settings for the first RAT. The electrical component 704 may be, or may include, means for automatically applying the power settings as power settings for the first RAT. Said means may include an algorithm executed by one or more processors.

In related aspects, the apparatus 700 may optionally include a processor component 710 having at least one processor, in the case of the apparatus 700 configured as a radio node. The processor 710, in such case, may be in operative communication with the components 702-704 or similar components via a bus 712 or similar communication coupling. The processor 710 may effect initiation and scheduling of the processes or functions performed by electrical components 702-704.

In further related aspects, the apparatus 700 may include a network interface component 714 for communicating with other network entities. The apparatus 700 may optionally include a component for storing information, such as, for example, a memory device/component 716. The computer readable medium or the memory component 716 may be operatively coupled to the other components of the apparatus 700 via the bus 712 or the like. The memory component 716 may be adapted to store computer readable instructions and data for performing the activity of the components 702-704, and subcomponents thereof, or the processor 710. The memory component 716 may retain instructions for executing functions associated with the components 702-704. While shown as being external to the memory 716, it is to be understood that the components 702-704 can exist within the memory 716.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for deploying small-coverage base stations. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communication, the method comprising:
   automatically determining first power settings for a first radio access technology (RAT) based on second power settings for a second RAT; and
   automatically applying the first power settings as power settings for the first RAT, wherein
   automatically determining the first power settings comprises determining a power setting function reflecting one or more differences between a first frequency band associated with the first RAT and a second frequency band associated with the second RAT, wherein the power setting function is based on at least one of a constant offset value, receiver sensitivity of the first RAT, receiver sensitivity of the second RAT, or a combination thereof.

2. The method of claim 1, wherein the power setting function is further based on at least one of interference at the first RAT, interference at the second RAT, or a combination thereof.

3. The method of claim 2, further comprising determining the interference at the first RAT based on at least one of measurements at a network listen module or measurements received from mobile entities.

4. The method of claim 1, wherein the constant offset value is a function of propagation profiles of the first and second frequency bands.

5. The method of claim 1, wherein automatically determining the first power settings comprises receiving the first power settings from a network node comprising an operations, administration, and maintenance (OAM) node.

6. The method of claim 1, further comprising adjusting power for the first RAT in response to a change in power for the second RAT.

7. The method of claim 1, further comprising automatically applying the first power settings as power settings for the second RAT.

8. An apparatus for wireless communication, comprising:
   at least one processor configured to: automatically determine first power settings for a first radio access technology (RAT) based on second power settings for a second RAT, and automatically apply the first power settings as power settings for the first RAT, wherein the at least one processor is configured to automatically determine the first power settings by determining a power setting function reflecting one or more differences between a first frequency band associated with the first RAT and a second frequency band associated with the second RAT, wherein the power setting function is based on at least one of a constant offset value, receiver sensitivity of the first RAT, receiver sensitivity of the second RAT, or a combination thereof; and
   a memory coupled to the at least one processor for storing data.

9. The apparatus of claim 8, wherein the power setting function is further based on at least one of interference at the first RAT, interference at the second RAT, or a combination thereof.

10. The apparatus of claim 9, wherein the at least one processor is further configured to determine the interference at the first RAT based on at least one of measurements at a network listen module or measurements received from mobile entities.

11. The apparatus of claim 8, wherein the constant offset value is a function of propagation profiles of the first and second frequency bands.

12. The apparatus of claim 8, wherein the at least one processor is configured to automatically determine the first power settings by receiving the first power settings from a network node comprising an operations, administration, and maintenance (OAM) node.

13. The apparatus of claim 8, wherein the at least one processor is further configured to adjust power for the first RAT in response to a change in power for the second RAT.

14. The apparatus of claim 8, wherein the at least one processor is further configured to automatically apply the first power settings as power settings for the second RAT.

15. An apparatus for wireless communication in a common radio node supporting multiple radio access technologies (RAT), comprising:
   means for automatically determining first power settings for a first radio access technology (RAT) based on second power settings for a second RAT; and
   means for automatically applying the first power settings as power settings for the first RAT, wherein
   the means for automatically determining the first power settings comprises means for determining a power setting function reflecting one or more differences between a first frequency band associated with the first RAT and a second frequency band associated with the second RAT, wherein the power setting function is based on at least one of a constant offset value, receiver sensitivity of the first RAT, receiver sensitivity of the second RAT, or a combination thereof.

16. The apparatus of claim 15, wherein the power setting function is further based on at least one of interference at the first RAT, interference at the second RAT, or a combination thereof.

17. The apparatus of claim 16, wherein the means for determining the interference at the first RAT comprises means for determining the interference based on at least one of measurements at a network listen module or measurements received from mobile entities.

18. The apparatus of claim 15, wherein the constant offset value is a function of propagation profiles of the first and second frequency bands.

19. The apparatus of claim 15, wherein the means for automatically determining the first power settings comprises means for receiving the first power settings from a network node comprising an operations, administration, and maintenance (OAM) node.

20. The apparatus of claim 15, further comprising means for adjusting power for the first RAT in response to a change in power for the second RAT.

21. The apparatus of claim 15, further comprising means for automatically applying the first power settings as power settings for the second RAT.

22. A non-transitory computer-readable medium comprising code, which, when executed by at least one computer, causes the at least one computer to perform operations for wireless communication in a common radio node supporting multiple radio access technologies (RAT), the non-transitory computer-readable medium comprising:
 code for automatically determining first power settings for a first radio access technology (RAT) based on second power settings for a second RAT; and
 code for automatically applying the first power settings as power settings for the first RAT, wherein
 the code for automatically determining the first power settings comprises code for determining a power setting function reflecting one or more differences between a first frequency band associated with the first RAT and a second frequency band associated with the second RAT, wherein the power setting function is based on at least one of a constant offset value, receiver sensitivity of the first RAT, receiver sensitivity of the second RAT, or a combination thereof.

23. The non-transitory computer-readable medium of claim 22, wherein the power setting function is further based on at least one of interference at the first RAT, interference at the second RAT, or a combination thereof.

24. The non-transitory computer-readable medium of claim 23, wherein the code for determining the interference at the first RAT comprises code for determining the interference based on at least one of measurements at a network listen module or measurements received from mobile entities.

25. The non-transitory computer-readable medium of claim 22, wherein the constant offset value is a function of propagation profiles of and second frequency bands.

26. The non-transitory computer-readable medium of claim 22, wherein the code for automatically determining the first power settings comprises code for receiving the first power settings from a network node comprising an operations, administration, and maintenance (OAM) node.

27. The non-transitory computer-readable medium of claim 22, further comprising code for causing the at least one computer to adjust power for the first RAT in response to a change in power for the second RAT.

28. The non-transitory computer-readable medium of claim 22, further comprising code for automatically applying the first power settings as power settings for the second RAT.

* * * * *